Figure 1:
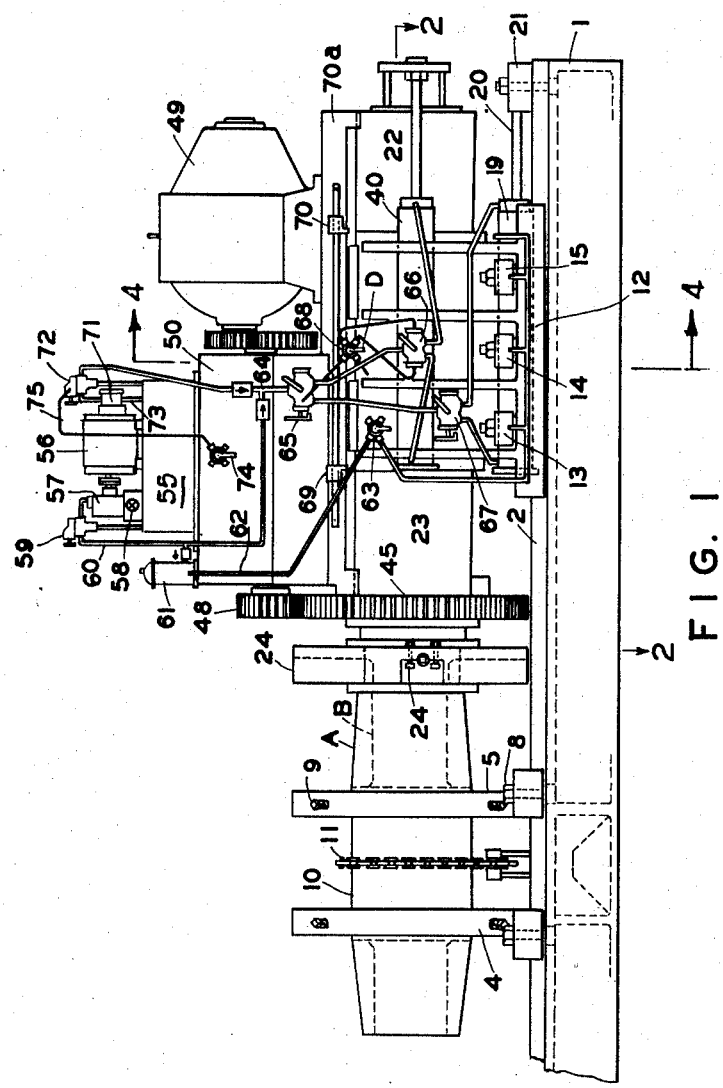

Nov. 3, 1959

B. A. WILSON 2,910,904

ROLL NECK CUTTING MACHINE

Filed April 27, 1954

3 Sheets-Sheet 1

INVENTOR.
Bert A Wilson
BY Jaspert + Canby

ATTORNEY

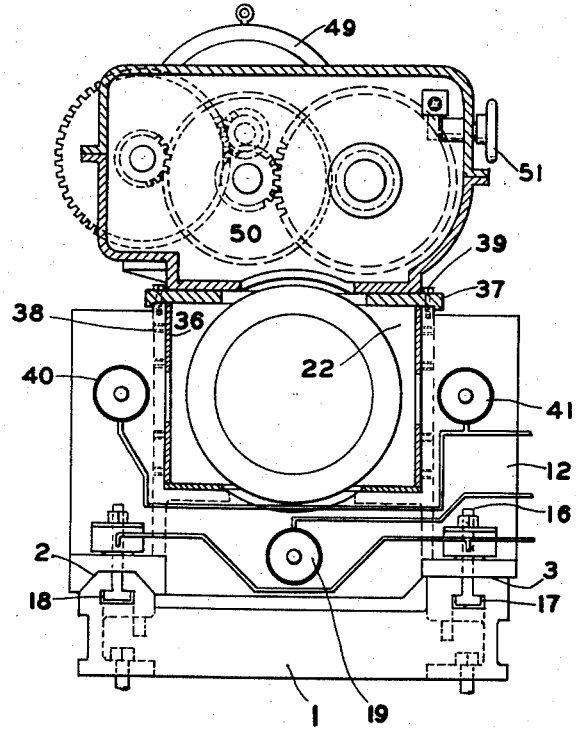
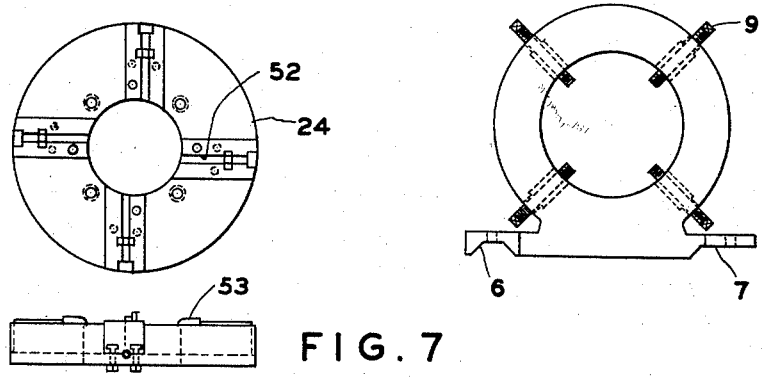
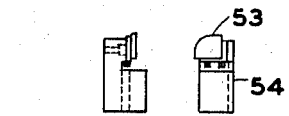

2,910,904
ROLL NECK CUTTING MACHINE

Bert A. Wilson, Pittsburgh, Pa.

Application April 27, 1954, Serial No. 425,920

2 Claims. (Cl. 82—20)

This invention relates to new and useful improvements in heavy duty machinery for cutting journal necks on rolls for rolling mills and the like and it is among the objects thereof to provide a cutting machine employing a revolving cutting head embodying multiple cutting tools that act simultaneously to remove the stock from roll castings or forged rolls to form the cylindrical neck of the roll.

It is a further object of the invention to provide a heavy duty cutting machine in which the cutting head is mounted on a revolving sleeve or hollow spindle mounted in a head stock that is mounted on the ways of a machine bed and movable thereon relative to the work.

Still another object of the invention is to provide a machine of the above designated character in which the hollow spindle is movable within the head stock independently of movement of the head stock by a ram that is actuated to move the cutter head into the work at desired rates of speed.

Still another object of the invention is the provision of hydraulic actuating mechanism for moving the head stock and the ram separately and independently, embodying control means for supplying the pressure fluids to the operating mechanisms.

It is still a further object of the invention to provide heavy duty metal cutting machinery embodying a head stock movable on the ways of a bed having hydraulic clamping means and manual controls therefor to positively lock the head stock on the machine support.

It is still a further object of the invention to provide cutting apparatus of the above designated character in which the feeding operations of the ram are automatically controlled to reverse the direction of movement.

Heretofore, it has been customary to machine the journals of mill rolls by the common practice of mounting them between the centers of a head and tail stock of a lathe and reducing the parts to be machined by a turning tool against which the work is swung in the conventional manner by rotation of the head stock. Because of the size, up to 60" in diameter, and weight up to 120,000 pounds, these rolled castings may be sprung out of the centers, which are relatively small in comparison with the size of the mass on which account the degree of force applied in the cutting or turning operation is quite limited. Also, the cutting operations were relatively slow because ordinarily but a single cutting tool would be engaged in the cutting operation. In accordance with the present invention where the journal necks may be as large as 36" in diameter, as many as 16 or more tools may be employed to simultaneously act upon the work, thereby reducing the stock in proportionately less time, for example at the rate of from fifty to two hundred and fifty cubic inches per minute without in any manner disturbing or displacing the rolled casting during the cutting operation as compared to five to seven cubic inches per minute by the conventional turning lathe method.

Figure 2:
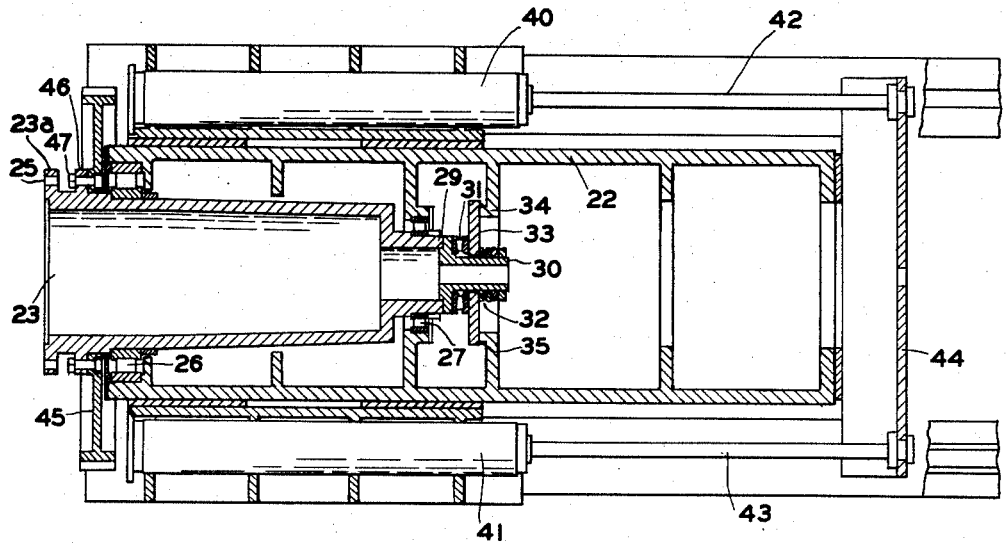
Figure 3:
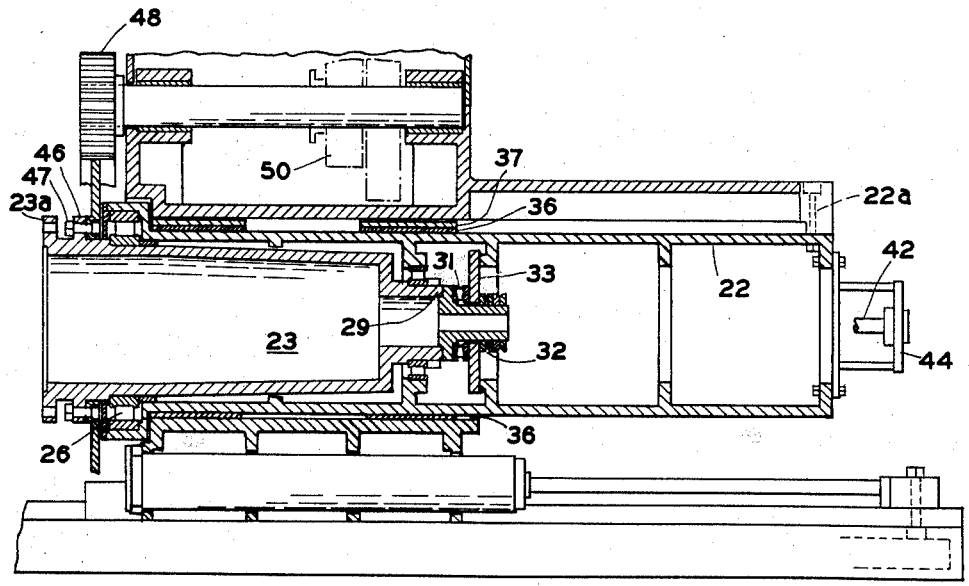

The invention will become more apparent from a consideration of the accompanying drawings constituting a part hereof, in which like reference characters designate like parts and in which:

Figure 1 is a front elevational view of a heavy duty cutting machine embodying the principles of this invention;

Fig. 2 a transverse section of the machine partially in elevation taken along the line 2—2 with Figure 1;

Fig. 3 a vertical cross sectional view partially in elevation taken along the line 3—3 of Fig. 1;

Fig. 4 a transverse vertical section taken along the line 4—4 of Figure 1;

Fig. 5 an end elevational view of a roll saddle;

Fig. 6 an end elevational view of a cutting head or chuck;

Fig. 7 a side elevational view of the chuck shown in Figure 6; and,

Figs. 8 and 9, side elevation and top plane views respectively, of a cutting tool for mounting in the chuck, shown in Fig. 7.

With reference to the several figures of the drawings, numeral 1 designates a machine bed which, as shown in Fig. 4, is provided with ways 2 and 3, 2 being of inverted V-shape and the way 3 being a plane flat surface. Mounted on the bed 1 are a pair of roll cradles 4 and 5 shown in Fig. 5 having ways 6 and 7 for resting on the ways 2 and 3 of the bed 1. The cradles are clamped on the ways by bolts 8, as shown in Fig. 1, and are provided with adjustable set screws 9 for centering and clamping a roll casting or forging 10, Fig. 1, which is further anchored to the bed of the machine by a chain or other center fastening means 11.

Mounted on the machine base 1 is a head stock generally designated by the numeral 12, having a V-shape and flat surface complementary to the ways 2 and 3 of the bed and being provided with clamping cylinders 13, 14 and 15, and 13', 14' and 15', such cylinders being provided on opposite sides of the head stock and being adapted to draw up bolts 16, the heads 17 of which are disposed in T-slots 18 in the ways 2 and 3 of the base, the hydraulic clamping cylinders being simultaneously operated hydraulically by means to be hereinafter described. The head stock 12 may be moved on the ways 2 and 3 of the machine base by means of a hydraulic cylinder 19, more clearly shown in Fig. 4, that has a piston disposed therein with a rod 20 connected to the base 1 by clamping means 21, Fig. 1.

The head stock carries a ram 22 in which is journaled a hollow spindle or drive sleeve 23 having a flanged end 23a for receiving the tool chuck 24, the latter being recessed to fit the flanged ends 23a, to which it is fastened by means of bolts 24, Fig. 1, extending through the bolt holes 25 of the hollow spindle 23.

Spindle 23 is journaled by radial roller bearings 26 and 27, the spindle 23 having a reduced end or neck portion 29 that is seated on a flanged sleeve 30 provided with thrust bearings 31 that have to withstand the back pressure of the cutting tool. Ball bearings 32 are provided to keep the drive sleeve from floating in an axial direction for which purpose a partition plate 33 is provided, which is welded to one of the radial ribs of the ram 22, as shown at 34 and 35.

The ram 22 is slidingly mounted between liners 36 and 37 which may be tightened by set screws that are fitted in the tap holes 38, as shown in Fig. 4, the liners being held in place and tightened by means of a clamp 37 fastened by screws 39, as shown in Figure 4 of the drawing. The ram 22 carrying the drive sleeve 23 is movable axially within the head stock by means of a pair of hydraulic cylinders 40 and 41, Figs. 2 and 4, which are provided with pistons having rods 42 and 43 respectively, joined by a yoke plate 44. The hydraulic cylinders are supplied with hydraulic fluid and the operation is controlled by apparatus that will be hereinafter described. With reference to Figs. 1, 2 and 3, a drive gear 45 is bolted to a flange 46 of the drive sleeve by bolts 47, the gear 45 intermeshing with the teeth of a pinion 48 operated through a gear reduction by the drive motor 49, the gear reduction being generally designated by the numeral 50 in Figs. 3 and 4 of the drawing. A speed control hand wheel 51 is provided for changing the gears to thereby change the turning speed of the drive sleeve 23. The gear drive support is attached to the ram 22 by bolt 22a, Fig. 3, to be movable therewith.

With reference to Figures 6 to 9 of the drawings, the tool chuck 24 is adapted for mounting four cutting tools that are disposed in the slots 52 that are off-center, the tool 53, which may be of a suitable alloy or other cutting material, being mounted in a block 54 that is slidably mounted in the slot 52 of the tool chuck, each block being adjustable and provided with means for locking the same in its adjusted position on the tool chuck.

With reference to Fig. 1 of the drawing, a tank 55 containing oil or other fluid may be mounted on top of the gear box 50 and a motor 56 mounted on tank 55 drives a variable volume feed pump 57 of the centrifugal type having variable stroke pistons of obtaining minute adjustment of the fluid displacement by means of an adjustable hand wheel 58. Pump 57 is provided with a relief valve 59 that determines the pressure delivered through conduit 60, the latter supplying fluid under pressure to an accumulator 61 that is connected by conduit 62 to a valve 63 that controls the application of the fluid to the clamping cylinders 13, 14, 15, etc., for locking the head stock to the machine bed.

Pump 57 is further connected by a T-connection 64 to a four-way valve 65 which is connected to valve 66 that controls the application of hydraulic fluid to the ram operating cylinders 40 and 41, and also to valve 67 that controls the application of the hydraulic fluid to the head stock operating cylinder 19, as shown in Fig. 1 of the drawings. Valve 65 is further connected to a valve 68 mounted on the head stock 12 that is actuated by stops 69 and 70 mounted on the gear drive support so that movement of the ram 28 will be controlled when the valve is engaged with the stops at the respective ends of the travel of the ram to reverse the direction of movement thereof. A vane type pump 71 is also driven by motor 56 and is provided with a pressure control valve 72 having a connection to the tank or sump 55 through conduit 73 and a connection to a by-pass relief valve 74 by conduit 75. When the machine is idling, the pressure control valve 72 would direct the fluid from the pump 71 through conduit 73 to the tank 55 by appropriate adjustment of the valve 74.

The operation of the above described cutting machine is briefly as follows:

With the roll casting mounted on the machine bed in the manner shown in Fig. 1, it being desired to machine the necks A to form the journal bearing shown by the dotted lines B, the cutters 53 having been set for this dimension on the chuck 24, the pump motor 56 is energized and the drive motor 49 is energized, the latter causing the hollow drive spindle 23 to revolve to thereby rotate the cutter head 24 at a suitable selected speed as determined by the setting of the hand wheel 51, Fig. 4. Valve 63 is then positioned to release the pressure on the clamping cylinders 13, 14, 15, etc., and valve 65 is set to direct fluid to the valve 67 which in turn is manipulated to supply pressure fluid to the head stock operating cylinder to cause the head stock and its auxiliary equipment to move in the direction of the work until the cutters 53 are brought adjacent to or in contact with the end of the roll casting. Hydraulic cylinders 13, 14, 15, etc., are then operated to draw up the clamping bolts 16 and the T-slots 18 to securely lock the head stock on the machine base 1.

Valve 65 is then set to supply fluid to the valve 66, which in turn is manipulated to apply hydraulic fluid to the ram operating cylinders 40 and 41, Fig. 4, which causes movement of the ram 22 carrying the drive sleeve 23 with the cutter head 24, in the direction of the roll casting to effect a rapid cutting or reduction of the stock A to form the journal neck B. The stop 69 may be set for the length of the cut so that when the valve 68 engages the stop lug 69, it will automatically control valve 66 to cut off the hydraulic fluid to cylinders 40 and 41 to stop the feeding of the ram. The clamping cylinders 13, 14, 15, etc., are then operated to disengage bolts 16 and the head stock is then returned to its retracted position by energizing the hydraulic cylinder 19. Also, the ram is returned to its retracted position by similarly supplying fluid to the operating cylinders 40 and 41, the movement to the retracted position being controlled by the stop lug 70 striking valve 68.

The vane type pump 71 provides a constant volume of fluid for feeding the ram and head stock in slow or rapid travel. The piston type pump 57 produces variable volume which is adjustable by the hand wheel 58 for feeding the ram and cutting spindle into the work at varying rates. It also supplies variable volume for feeding the head stock which is mostly for fast movement to initially align the cutter with the work to thereby allow for a full stroke of the ram in its cutting movement. However, the head stock may also be actuated by the hydraulic cylinder 19 for slow movement for finished cuts using the pressure fluid from one or both pumps from zero to full volume. Feeding of the cutter by retaining the ram 22 stationary and by use of the head stock cylinder 19 only is desirable because the weight of the head stock, ram, drive mechanism and pumps bearing on the ways 2 and 3 of the machine bed 1 stabilizes the cutting action in that it prevents flexing or chatter.

Because of the difference in pressure between the pumps 57 and 71 high or low pressure fluid may be selected for operating cylinders 40 and 41 for heavy or light cuts. The purpose of the two feeding cylinders 40 and 41 is to give an even pull on the ram so as to avoid deflection when cutting.

It will be evident that solenoids with trip or push button controls may be employed to operate the valves 65, 66 and 67 and that the relief valves 59 and 72 control the pressure of the oil in the lines.

It is further evident from the foregoing description of the invention that a heavy duty cutting machine with the revolving cutter head and the ram feed is capable of a very fast cutting action which makes it especially useful in machining journal necks of large and small rolls, particularly of rolls where as much as 3″ of stocks have to be removed as in a 60″ roll with a 36″ neck, previously referred to.

By means of the mounting of the hollow drive sleeve in the radial roller bearings with the thrust bearing, as described, within the feeding ram, which in turn is solidly supported by the bearing liners in the head stock, accuracy of machining can be absolutely maintained. Also, because of the hydraulic feed of the ram, positive controlled feeding may be obtained at predetermined pressures, such being regulated by the piston type variable volume feed pump 57 controlled by the relief valve 59. Accuracy is further assured by the rigid mounting of the roll casting on the machine bed as shown and described, which does not permit any displacement of the casting during the machining operation no matter what the feeding pressures might be. This rigid mounting, as distinguished from the swing mount of a casting in a turning lathe permits the use of excessive feeding pressures to bring about a rapid and economical machining of the roll necks.

Also to avoid duplication by illustrating two of the cutting machines in Figure 1, a second cutting machine for machining the other journal neck is not shown, but it is evident that two machines may be employed to operate simultaneously on the same roll casting to effect a speedy reduction of the roll necks.

This is possible without extending the machine bed any great length because both the head stock and ram may be moved independently for feeding the tool into the work.

Although one embodiment of the invention has been herein illustrated and described, it will be evident to those skilled in the art that various modifications may be made in the details of construction without departing from the principles herein set forth.

I claim:

1. In a machine tool for machining the necks of roll castings, the combination of a head stock mounted on parallel slideways of a bed, a ram mounted in said head stock for sliding movement therein, a tool spindle journaled in said ram comprising a hollow sleeve having one end extending beyond said ram, a drive for said spindle mounted for movement with said ram and having gear tooth connection with the extended portion of said sleeve, a pair of hydraulic cylinders mounted on the head stock on opposite sides of the ram having a piston connection with a cross-head secured to one end of the ram, a hydraulic cylinder beneath the ram attached to the head stock having a piston connected to one end of the machine bed, clamping cylinders mounted on opposite sides of the head stock having pistons with T-shaped ends disposed in T-slots of the machine bed ways for clamping the head stock to the bed, and hydraulic means including a source of fluid pressure and valve control means for selectively applying fluid pressure to the clamping cylinders and to the ram and head stock actuating cylinders to effect engagement or release the head stock clamping means and to subject the head stock and ram to axial movement independently whereby the total feeding movement of the machine tool is the sum of the distance of travel of the head stock and the ram.

2. In a machine tool for machining the necks of roll castings, the combination of a head stock mounted on parallel slideways of a bed, a ram mounted in said head stock for sliding movement therein, a tool spindle journaled in said ram, a drive for said spindle mounted for movement with said ram, said tool spindle comprising a sleeve extending beyond said ram having a flanged end for receiving a rotary cutting tool, the opposite end of the sleeve having a reduced neck portion abutting a thrust collar secured to a partition member in the ram, the spindle being provided with roller bearings adjacent the flanged end and on the reduced neck portion, and thrust collar bearings disposed between the thrust collar and partition to absorb the thrust of the cutting tool, said thrust collar being provided with a ball bearing on the opposite side of the partition member to maintain alignment of the thrust collar with the tool spindle.

References Cited in the file of this patent

UNITED STATES PATENTS

| Number | Name | Date |
|---|---|---|
| 552,008 | Scott | Dec. 24, 1895 |
| 939,269 | Killian | Nov. 9, 1909 |
| 1,010,616 | Gottschalk | Dec. 5, 1911 |
| 1,414,176 | Carroll | Apr. 25, 1922 |
| 1,419,936 | Ladd | June 20, 1922 |
| 1,594,903 | Gray | Aug. 3, 1926 |
| 1,840,231 | Harrison | Jan. 5, 1932 |
| 2,030,562 | Guirl | Jan. 10, 1939 |
| 2,148,348 | Groene | Feb. 21, 1939 |
| 2,229,701 | Jelinek | Jan. 28, 1941 |
| 2,235,083 | Poole | Mar. 18, 1941 |
| 2,253,303 | La Pointe | Aug. 19, 1941 |
| 2,343,420 | Podesta | Mar. 7, 1944 |
| 2,345,060 | Morton | Mar. 28, 1944 |
| 2,473,306 | Schreiber | June 14, 1949 |
| 2,499,235 | Tyson | Feb. 28, 1950 |
| 2,540,586 | Lauterbur | Feb. 6, 1951 |
| 2,575,116 | Murray | Nov. 13, 1951 |
| 2,587,352 | Manning | Feb. 26, 1952 |
| 2,605,678 | Armitage | Aug. 5, 1952 |
| 2,612,071 | Kurzweil | Sept. 30, 1952 |
| 2,627,197 | Le Tourneau | Feb. 3, 1953 |